United States Patent [19]

Clampitt et al.

[11] 4,042,763

[45] Aug. 16, 1977

[54] PHOTODEGRADABLE RESIN COMPOSITIONS

[75] Inventors: Bert Howard Clampitt, Katy; Richard Harry Havens, Hockley, both of Tex.

[73] Assignee: Gulf Research & Development Company, Pittsburgh, Pa.

[21] Appl. No.: 730,901

[22] Filed: Oct. 8, 1976

[51] Int. Cl.² .................................................. C08J 3/20
[52] U.S. Cl. .................................. 526/4; 260/23 H; 260/897 R; 260/897 B; 260/DIG. 43
[58] Field of Search .................. 260/DIG. 43, 897 R, 260/897 B, 23 H; 526/4

[56] References Cited

U.S. PATENT DOCUMENTS

| | | | |
|---|---|---|---|
| 3,454,510 | 7/1969 | Newland et al. | 260/DIG. 43 |
| 3,520,955 | 7/1970 | Gilbert et al. | 260/897 R |
| 3,797,690 | 3/1974 | Taylor et al. | 260/DIG. 43 |

*Primary Examiner*—Eugene C. Rzucidlo
*Attorney, Agent, or Firm*—Richard L. Kelly

[57] ABSTRACT

Resin compositions having enhanced photodegradable characteristics are prepared by incorporating minor quantities of a cobalt salt such as cobalt naphthenate in a polymer blend containing at least 90 weight % of a film-forming ethylene polymer, and from about 1 to 10 weight % of a polyethylene-like polymer containing trans carbon-to-carbon double bonds in the polymer chain; such polyethylene-like polymer having been prepared by thermal cracking of specified ethylene-vinyl acetate copolymers under the conditions set forth in U.S. Pat. No. 3,520,955.

4 Claims, No Drawings

PHOTODEGRADABLE RESIN COMPOSITIONS

BACKGROUND OF THE INVENTION

Films of ethylene polymers are widely used in lieu of paper for many purposes, including wraps for sandwiches and supplies taken on picnics and similar outings. Inevitably, certain of such films are discarded in areas of public accommodation and become objectionable litter. Such litter can accumulate in substantial volume by reason of the fact that such films are not readily degraded by natural environmental factors.

By reason of the facts discussed above, increasing attention is being given to the problem of developing ethylene polymer films which can be used for wrapping foods and the like, but which will degrade at an accelerated rate when exposed to environmental elements, including sunlight. One of the means that has been suggested to enhance the photodegradable characteristics of ethylene polymer films is to incorporate certain cobalt salts into the film. While the incorporation of cobalt salts into ethylene polymer films does accelerate the degradation of the film when it is exposed to sunlight, the improvement is not as great as would be desired.

SUMMARY OF THE INVENTION

It now has been discovered that resin compositions which degrade readily when exposed to sunlight can be prepared by incorporating a suitable cobalt salt, such as cobalt naphthenate, into a polymer blend containing at least 90 wt. % of a conventional film-forming ethylene polymer and from about 1 to 10 weight % of a polyethylene-like polymer containing trans carbon-to-carbon double bonds in the polymer chain, such polyethylene-like polymer being prepared by thermal cracking of certain ethylene-vinyl acetate copolymers under specific conditions as subsequently described.

DETAILED DESCRIPTION OF THE INVENTION

The major component in the compositions of the invention will be a conventional film-forming ethylene polymer. Typically such film-forming ethylene polymers will be of the so-called low density type having densities in the range of about 0.92 to about 0.93. Typically such ethylene polymers are prepared by polymerizing ethylene at an elevated temperature at a pressure of the order of 1000 atmospheres or more in either an autoclave-type reactor or in a tubular reacter.

The second polymer component of the compositions of the invention will be a polyethylene-like polymer containing about 0.8 to about 75 trans carbon-to-carbon double bonds per 1000 carbon atoms. These polyethylene-like polymers are prepared by thermally cracking certain ethylene-vinyl acetate copolymers in an inert atmosphere as more fully set forth in U.S. Pat. No. 3,520,955, which description is incorporated herein by reference. In general terms, such polyethylene-like polymers are prepared by subjecting an ethylene-vinyl acetate copolymer containing about 0.5 to 35 weight % vinyl acetate comonomer to a temperature from about 275° C to about 400° C in an inert atmosphere for a time period varying with temperature from about one hour to about eight hours at 275° C to from about 0.5 to about 10 minutes at 400° C, thereby cracking said ethylene-vinyl acetate copolymer to acetic acid and forming trans carbon-to-carbon double bonds in the polymer chain. The final polymer ordinarily will contain some residual uncracked vinyl acetate.

The third component included in the compositions of the invention will be any cobalt salt compatible with the polymer components of the compositions. It is possible to use the common, simple inorganic cobalt salts such as cobalt chloride, cobalt phosphate, cobalt sulfate and the like. It is preferred, however, to employ cobalt salts of organic materials such as cobalt acetate, cobalt salts of long chain fatty acids, such as cobalt oleate, cobalt stearate, and the cobalt salts employed in the coating arts as driers such as cobalt naphthenate.

The three essential components of the compositions will be employed in proportions such that the film-forming ethylene polymer will constitute at least about 90 weight % of the composition. The polyethylene-like polymer containing predominantly trans carbon-to-carbon double bond unsaturation along the polymer backbone chain will be employed in an amount constituting about 1 to about 10 wt. % and preferably about 5–10 wt. % of the total composition. The cobalt salt will be employed in an amount such that its cobalt metal content will be present in an amount equivalent to about 1 – 3000 ppm and preferably 3 – 300 ppm of the total composition. In addition to the three essential components of the compositions, the compositions also may contain minor amounts of other chemicals conventionally employed in ethylene polymer compositions converted to film. Typical examples of such materials include chemicals incorporated in the resin compositions to function as slip agents, antiblock agents, stabilizers, and the like.

The components of the compositions will be blended together in any manner commonly employed in the compounding of ethylene polymer compositions. For convenience, it is preferred to prepare a master batch of the desired cobalt salt in the polyethylene-like polymer containing trans carbon-to-carbon unsaturation in the polymer backbone and to add this master batch to the film-forming ethylene polymer. This blend then can be passed through a compounding extruder to compare homogeneous compositions suitable for conversion into the desired film.

It has been noted that the compositions of the invention, when exposed to actinic light degrade at a significantly faster rate than do corresponding film-forming ethylene polymers containing a like concentration of the same cobalt salt. The rate at which the compositions of the invention degrade upon exposure to actinic light can be demonstrated by exposing films of the compositions to ultraviolet violet light and measuring the change of elongation at break with time. The hours of exposure required to reduce the elongation at break by 50% of its initial value is considered to be a good measure of photodegradability — particularly when comparing the relative photodegradability of two polymer samples.

EXAMPLE

A resin composition without the invention was prepared by preparing a blend of 90 weight percent of a commercial grade ethylene homopolymer having a density of 0.920 and 10 weight % of a polyethylene-like polymer containing approximately 1 trans carbon-to-carbon double bond for each 200 carbon atoms in the polymer. The ethylene homopolymer was prepared by a high pressure autoclave process. The polyethylene-like polymer containing the predominantly trans carbon-to-carbon double bonds was prepared by thermally cracking an ethylene-vinyl acetate copolymer containing 3.8 weight % vinyl acetate employing the procedure outlined in U.S. Pat. No. 3,520,955. The final polymer contained 0.8 weight % vinyl acetate. Particles of the polymer were tumbled together to prepare a uniform physical mixture and cobalt naphthenate, dissolved in hexane, was uniformly coated onto the polymer particles in an amount such that the final composition contained 50 ppm cobalt. The blended polymer particles were then warmed in a vacuum dessicator to evaporate the hexane therefrom. One mil film was prepared from this composition by a blown film extrusion process.

As a control, the identical quantity of cobalt naphthenate was incorporated into the same ethylene homopolymer described in the paragraph above. One mil film of the ethylene homopolymer containing cobalt naphthenate was prepared by a blown film extrusion process.

Several specimens of the film prepared from the compositions of the invention and the films prepared from the control composition were mounted on a circular rack in a Rayonette Photochemical Reactor and exposed to black light having a maximum wave length of 2537 Angstroms. The film specimens were mounted about one-half inch from the radiation tubes. Periodically, film samples were removed and their elongation at break determined in accordance with ASTM D-882-64T.

The elongation at break of the films prepared from the compositions of the invention had been reduced to 50% of their initial value in 18 hours. By contrast, 40 hours of exposure was required with the control films to reduce their elongation at break to 50% of its initial value.

What is claimed is:

1. A photodegradable resin composition consisting essentially of an intimate, physical admixture of:
   a. At least 90 weight % of a film forming ethylene polymer,
   b. From about 1 to about 10 weight % of a polyethylene-like polymer containing about 0.8 to about 75 trans carbon-to-carbon double bonds per 1,000 carbon atoms, and
   c. A minor amount of cobalt salt whose cobalt metal content is equivalent to about 1 - 3000 ppm of the total composition;

said polyethylene-like polymer having been prepared by subjecting an ethylene-vinyl acetate copolymer containing about 0.5 to 35 percent by weight of vinyl acetate comonomer to a temperature from about 275° C to about 400° C in an inert atmosphere for a time period varying with temperature from about 1 hour to about 8 hours at 275° C to from about 0.5 to about 10 minutes at 400° C, thereby cracking said ethylene-vinyl acetate copolymer to acetic acid and forming trans carbon-to-carbon double bonds in the polymer chain.

2. The composition of claim 1 which contains substantially 90 weight % of said film forming ethylene polymer and substantially 10 weight % of said polyethylene-like polymer.

3. The composition of claim 1 in which said cobalt salt is cobalt naphthenate.

4. The composition of claim 2 in which cobalt salt is cobalt naphthenate.

* * * * *